May 19, 1942.   E. C. WEISKOPF   2,283,343
ELECTRICALLY HEATED IMPLEMENT
Filed Nov. 25, 1939
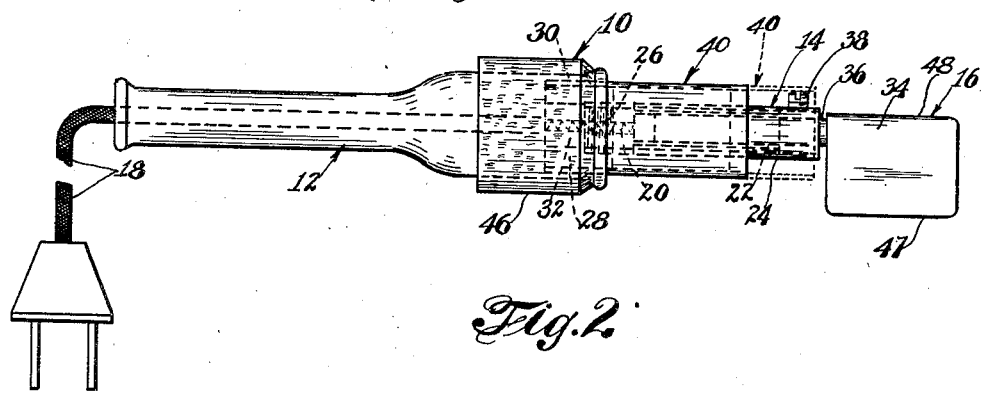
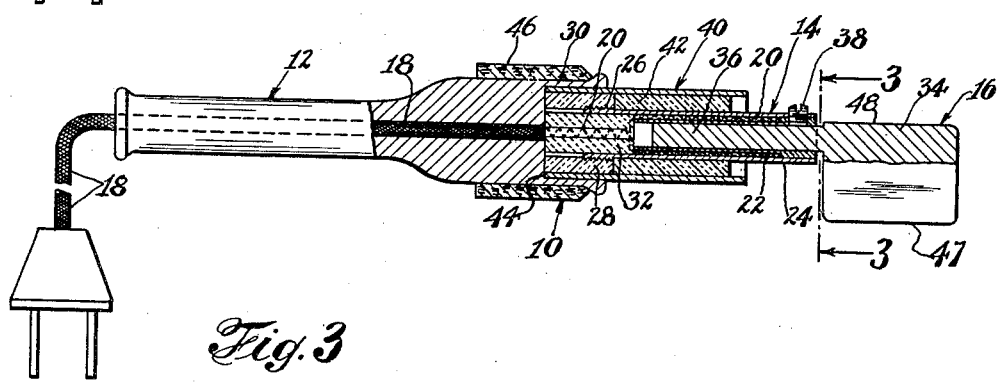
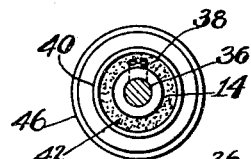
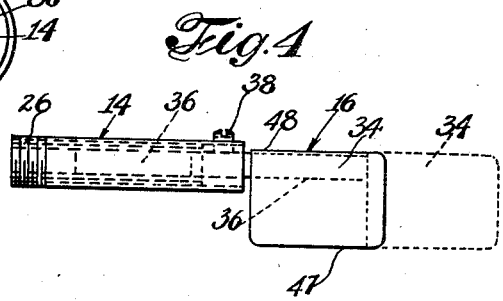
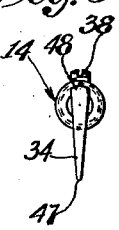
INVENTOR
EDWIN C. WEISKOPF
BY Harry Cohen
ATTORNEY Patented May 19, 1942

2,283,343

UNITED STATES PATENT OFFICE 2,283,343

ELECTRICALLY HEATED IMPLEMENT

Edwin C. Weiskopf, New York, N. Y.

Application November 25, 1939, Serial No. 306,065

2 Claims. (Cl. 219—21)

This invention relates to an electrically heated implement or tool.

The main object of the invention is to provide a heated implement or tool to facilitate the cutting and trimming of paraffin blocks or objects impregnated with paraffin, particularly in the laboratory by the pathological, histological or biological technician.

Another object of the invention is the provision of a heated implement of the character described having provision for regulating the temperature to which the tool is heated.

A further object is to produce an electrically heated implement of the character described which uses very little current.

The above objects of the invention and other objects which might hereinafter appear will be more fully understood from the following description considered in connection with the accompanying drawing which illustrates the preferred embodiment of the invention.

In the drawing:

Fig. 1 is a side view in elevation of the implement embodying the invention;

Fig. 2 is a view partly in elevation and partly in longitudinal section of the implement illustrated in Fig. 1;

Fig. 3 is a sectional view on the line 3—3 of Fig. 2;

Fig. 4 is a view in side elevation of the heating element and of the blade, detached from the handle, and showing the adjustment of the blade in the heating element for regulating the temperature to which the blade is heated;

Fig. 5 is an end view of the blade.

Referring now to the drawing in detail, the implement 10 embodying the present invention comprises a handle 12 of thermal and electrical insulation material, such as wood or "Bakelite," an electric heating unit 14 and a blade 16. Handle 12 is hollow for the passage of electric wires 18 to the heating resistance unit 20 of the heater 14. Said heater is tubular and comprises inner and outer cylindrical members 22, 24, respectively, between which the resistance element 20 is positioned in insulated relation thereto. Tubular member 14 has an inner threaded portion 26 which engages within a threaded socket member 28 of insulation material positioned in the socket portion 30 of handle 12. Socket member 28 also receives an insulation base 32 through which the electric wires pass for connection to the resistance element of heating unit 14.

The blade 16 is made of suitable metal and comprises, preferably in integral relation, a head 34 and a cylindrical shank 36. Shank 36 is of substantial length, preferably about as long as unit 14, and is received within heating unit 14 in which it is secured in adjusted position longitudinally of said heating unit in any suitable way as by a set screw 38. It will be understood that by projecting more or less of shank 36 within heating unit 14 while the latter is energized, it is possible to regulate the temperature to which head 34 of the blade is heated. This provides a convenient means for regulating the temperature of the blade and eliminates the necessity for adjustable resistances. The adjustment of the blade 16 in relation to the heating unit 14 for regulating the temperature of the blade is illustrated in Fig. 4 which shows in full lines the position of the blade for maximum heating thereof and in dotted lines the position of the blade for heating thereof to a lower temperature. Obviously intermediate temperatures of the blade can be obtained by intermediate positions of the latter and more particularly the shank thereof in relation to heating unit 14.

Provision is made for protecting the hand of the user of the heated implement from inadvertent contact with the heating unit 14 and for this purpose a tubular sleeve 40, which may be made of metal or insulation material, is disposed over heating unit 14 and is thermally and electrically insulated therefrom by a layer 42 of suitable material, for example, asbestos. Tube 40 has a sliding fit at its inner edge portion 44 between the inner surface of handle socket 30 and the outer surface of member 28 and is movable longitudinally of heating unit 14 to substantially entirely cover said heating unit. When access to said screw 38 is desired, the sleeve 40 is moved back from the dotted line position shown in Fig. 1 to the full line position, and after the adjustment of the shank of blade 16 and the fastening of the set screws 38, sleeve 40 can be moved to its dotted line position when it is desired to completely cover the heating unit. A friction member here shown as a sleeve 46 of cork is mounted on the forward end of handle 12 to provide a non-slip grip in the hand of the user of the implement.

The head 34 of blade 16 has a relatively narrow edge 47 which, however, need not be very sharp and a wider edge 48 which is somewhat rounded for use for smoothing or trimming rough edges. While the implement may be put to numerous uses, it is especially advantageous for use in trimming paraffin blocks, separating paraffin blocks from object disks, attaching blocks to object disks, cutting large blocks of paraffin, separating cut sections or ribbons on water, making neat uniform blocks for filing purposes, cutting blocks evenly and neatly when tissue is embedded en-masse. Numerous other uses will be found for the implement by the technician in the laboratory.

While I have shown and described the preferred embodiment of my invention, it will be understood that certain changes in the details of construction and in the arrangement of parts may be made therein. Therefore, I do not wish to be limited to the construction herein shown or described except to the extent which may be required by the scope of the appended claims.

Having thus described my invention, what I claim and desire to secure by Letters Patent is:

1. A tool of the class described comprising a metallic tubular member provided with an electric heating element, a blade carried by said tubular member and heated thereby when said electric heating element is energized, said blade having a wedge shaped head and a shank projecting from one end thereof at its thicker edge portion, said shank being in line with and positioned in said tubular member for transmitting heat therefrom to said head of the blade, the thinner edge portion of said head being offset laterally a substantial distance from said shank, means for securing said shank in position in said tubular member, and a handle member extending longitudinally of said tubular member externally thereof and thermally insulated therefrom, said handle having an insulation socket having a screw-threaded bore, one end of said tubular member being screw-threaded and engaging said socket in said screw-threaded bore thereof.

2. A tool of the class described comprising a tubular member provided with an electric heating element, a handle connected to one end of said tubular member, a blade carried by said tubular member and heated by the latter when said heating element is energized, said blade having a shank positioned in said tubular member and adjustable longitudinally thereof outwardly of the other end of said tubular member to vary the heating of said blade, means adjacent said other end of said tubular member for removably securing said shank in adjusted position, and a sleeve projecting from said handle and surrounding said tubular member, and heat insulation means between said tubular member and said sleeve, said sleeve being adjustable longitudinally of said tubular member to provide access to said securing means.

EDWIN C. WEISKOPF.